United States Patent
Park

(10) Patent No.: US 9,312,564 B2
(45) Date of Patent: Apr. 12, 2016

(54) POSITIVE ELECTRODE INCLUDING FIRST AND SECOND LITHIUM COMPOUNDS AND LITHIUM BATTERY USING SAME

(75) Inventor: Kyu-Sung Park, Suwon-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 650 days.

(21) Appl. No.: 12/929,801

(22) Filed: Feb. 16, 2011

(65) Prior Publication Data

US 2011/0200876 A1 Aug. 18, 2011

(30) Foreign Application Priority Data

Feb. 18, 2010 (KR) .................. 10-2010-0014743

(51) Int. Cl.
| | | |
|---|---|---|
| *H01M 4/58* | (2010.01) | |
| *H01M 10/0525* | (2010.01) | |
| *H01M 4/485* | (2010.01) | |
| *H01M 4/505* | (2010.01) | |
| *H01M 4/525* | (2010.01) | |

(52) U.S. Cl.
CPC .......... *H01M 10/0525* (2013.01); *H01M 4/485* (2013.01); *H01M 4/505* (2013.01); *H01M 4/525* (2013.01); *H01M 4/5825* (2013.01); *Y02E 60/122* (2013.01)

(58) Field of Classification Search
USPC ........... 429/231.1, 231.3, 231.5, 231.95, 223, 429/224, 221, 229, 218.1, 220; 252/182.1
See application file for complete search history.

(56) References Cited

U.S. PATENT DOCUMENTS

| | | | | |
|---|---|---|---|---|
| 2002/0119375 | A1* | 8/2002 | Zhang | .......... 429/232 |
| 2009/0155694 | A1 | 6/2009 | Park | |
| 2009/0325072 | A1* | 12/2009 | Maeda et al. | ........... 429/220 |

FOREIGN PATENT DOCUMENTS

| | | | |
|---|---|---|---|
| JP | 2002-042892 | A | 2/2002 |
| JP | 2006-066330 | A | 3/2006 |
| JP | 2009-152197 | A | 7/2009 |
| KR | 10 2006-0108110 | A | 10/2006 |
| KR | 10-2007-0066453 | A | 6/2007 |
| KR | 10 2009-0066021 | A | 6/2009 |
| KR | 10-2010-0002107 | A | 1/2010 |

OTHER PUBLICATIONS

Li, et at "ZrO$_2$ Coating of LiNi$_{1/3}$Mn$_{1/3}$O$_2$ Cathode Materials for Li-ion Batteries" Ionics, Aug. 12, 2008, pp. 493-496.
Korean Office Action dated Jan. 28, 2016 in Corresponding Korean Patent Application No. 10-2010-0014743.

* cited by examiner

*Primary Examiner* — Raymond Alejandro
(74) *Attorney, Agent, or Firm* — Lee & Morse, P.C.

(57) ABSTRACT

A positive electrode having a surface on which a positive electrode active material composition including a positive electrode active material is formed. The positive electrode includes a first lithium compound having an open-circuit voltage less than 3V with respect to lithium metal, and a second lithium compound having an open-circuit voltage of 3 V or greater with respect to lithium metal. The first lithium compound includes a solid solution represented by Formula 1:

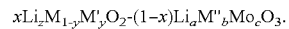

$xLi_zM_{1-y}M'_yO_2\text{-}(1-x)Li_aM''_bMo_cO_3$.

11 Claims, 5 Drawing Sheets

POSITIVE ELECTRODE INCLUDING FIRST AND SECOND LITHIUM COMPOUNDS AND LITHIUM BATTERY USING SAME

CROSS-REFERENCE TO RELATED APPLICATION

Korean Patent Application No. 10-2010-0014743, filed on Feb. 18, 2010, in the Korean Intellectual Property Office, and entitled: "Positive Electrode and Lithium Battery Using Same," is incorporated by reference herein in its entirety.

BACKGROUND

1. Field

Embodiments relate to positive electrodes and lithium batteries including the same, and to positive electrodes with improved electrical characteristics and lithium batteries including the same.

2. Description of the Related Art

There is a demand for improving the high-rate characteristics and capacities of positive electrode active materials, so as to produce next-generation lithium batteries having a high capacity. Lithium batteries having a high capacity have become more necessary, as mobile electronic devices have become more complex and have more functions. Such lithium batteries may be manufactured by improving designs of battery systems, manufacturing techniques, and materials thereof.

SUMMARY

Embodiments are directed to positive electrodes including positive electrode active materials with improved electrical characteristics.

Embodiments are also directed to lithium batteries including the positive electrodes.

Additional aspects will be set forth in part in the description which follows and, in part, will be apparent from the description, or may be learned by practice of the presented embodiments.

Embodiments may be realized by providing a positive electrode that includes a surface on which a positive electrode active material composition having a positive electrode active material is formed. The positive electrode includes a first lithium compound having an open-circuit voltage less than 3 V with respect to lithium metal, and a second lithium compound having an open-circuit voltage of 3 V or greater.

The first lithium compound includes a solid solution represented by Formula 1 below:

$$xLi_zM_{1-y}M'_yO_2\text{-}(1-x)Li_aM''_bMo_cO_3,\qquad \text{<Formula 1>}$$

where M is at least one selected from the group consisting of titanium (Ti), vanadium (V), chromium (Cr), manganese (Mn), iron (Fe), cobalt (Co), nickel (Ni), and copper (Cu), is at least one selected from the group consisting of magnesium (Mg), aluminum (Al), zinc (Zn), zirconium (Zr), gallium (Ga), and germanium (Ge), M'' is at least one element selected from the group consisting of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), vanadium (V), scandium (Sc), yttrium (Y), and a rare-earth element.

x, y and z satisfy $0<x<0.5$, $0\le y<0.5$, and $0.7<z<1.3$ respectively, and a, b and c satisfy $0.1\le a\le 2.3$, $0\le b\le 0.3$, and $0.7\le c\le 1.1$, respectively.

The first lithium compound may include a solid solution represented by Formula 2 below:

$$xLiM_{1-y}M'_yO_2\text{-}(1-x)Li_2MoO_3,\qquad \text{Formula 2}$$

where M is at least one selected from the group consisting of titanium (Ti), vanadium (V), chromium (Cr), manganese (Mn), iron (Fe), cobalt (Co), nickel (Ni), and copper (Cu), M' is at least one selected from the group consisting of magnesium (Mg), aluminum (Al), zinc (Zn), zirconium (Zr), gallium (Ga), and germanium (Ge), and X and y satisfy $0<x<0.3$, and $0\le y\le 0.5$, respectively.

The second lithium compound may include at least one metal element selected from the group consisting of cobalt (Co), nickel (Ni), and manganese (Mn).

The first lithium compound and the second lithium compound may be mixed in a ratio of about 0.01:about 0.99 to about 0.40:about 0.60 by weight.

The first lithium compound may include $xLiFeO_2\text{-}(1-x)Li_2MoO_3$ (where x satisfies $0<x<0.3$).

The first lithium compound may further include a metal oxide coating layer.

The metal oxide may include at least one compound selected from compounds represented by Formulae 3 through 6 below:

$$Me_a(MoO_3)_b,\qquad \text{Formula 3}$$

where Me is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag) and lithium (Li), a satisfies $0.5\le a\le 1.5$, and b satisfies $0.3\le b\le 3$;

$$Me'_c(MoO_4)_d,\qquad \text{Formula 4}$$

where Me' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag) and lithium (Li), c satisfies $0.5\le c\le 1.5$, and d satisfies $0.3\le d\le 3.0$;

$$Me''O_e,\qquad \text{Formula 5}$$

where Me'' is at least one selected from the group consisting of aluminium (Al), magnesium (Mg), silicon (Si), titanium (Ti), zirconium (Zr), zinc (Zn), barium (Ba), strontium (Sr), calcium (Ca) and lithium (Li), and e satisfies $0.5\le e\le 2.5$; and $$Li_3PO_4\qquad \text{Formula 6}$$

Embodiments may also be realized by providing a lithium battery that includes the positive electrode, a negative electrode, and an organic electrolyte.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
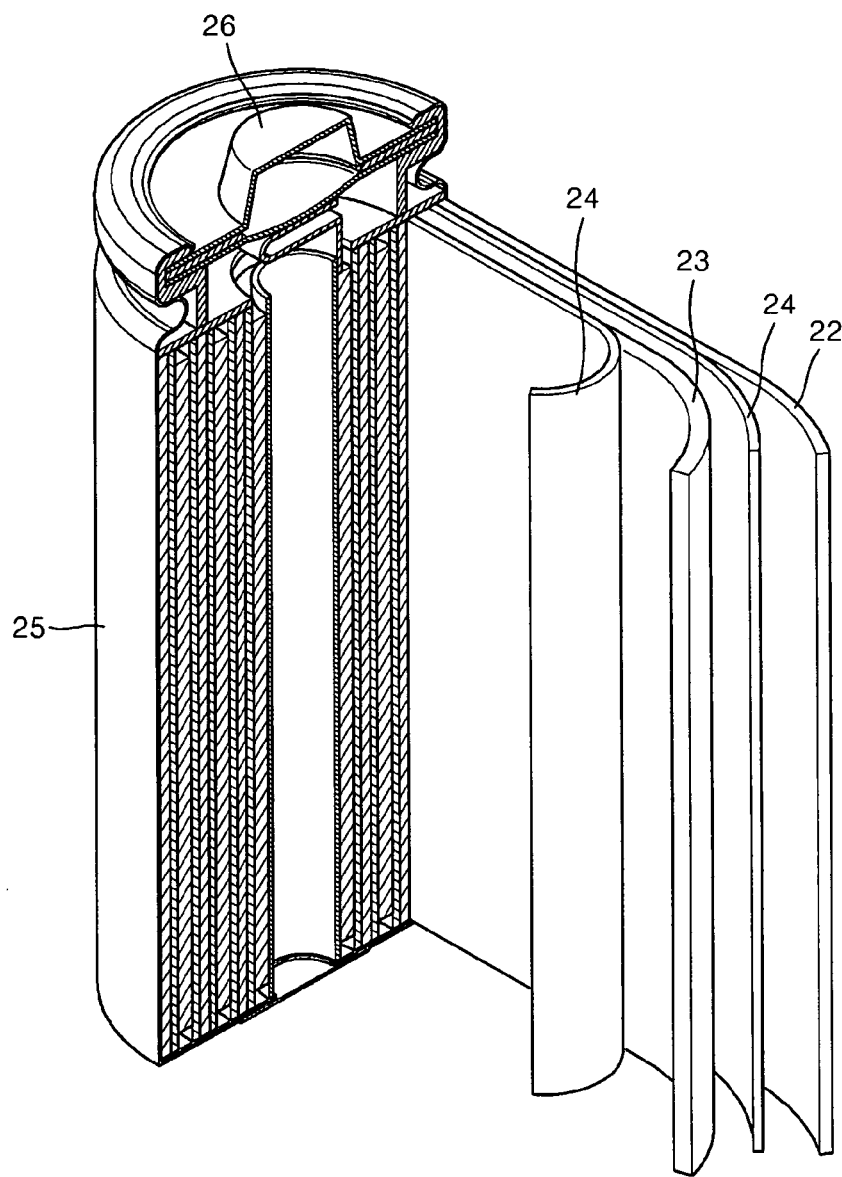
FIG. 1 illustrates a schematic view of a structure of a lithium battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Accordingly, the embodiments are merely described below, by referring to the figures, to explain aspects of the present description.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present.

One or more embodiments may include a positive electrode including a positive electrode active material formed on a current collector. The positive electrode active material may include a first lithium compound having an open-circuit voltage (OCV) less than 3 V with respect to lithium metal and a second lithium compound having an OCV of 3 V or greater. The first lithium compound may include a solid solution represented by Formula 1 below:

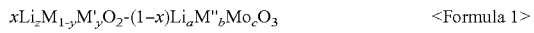
<Formula 1>

M is at least one selected from the group consisting of titanium (Ti), vanadium (V), chromium (Cr), manganese (Mn), iron (Fe), cobalt (Co), nickel (Ni), and copper (Cu).

M' is at least one selected from the group consisting of magnesium (Mg), aluminum (Al), zinc (Zn), zirconium (Zr), gallium (Ga), and germanium (Ge).

M" is at least one element selected from the group consisting of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), vanadium (V), scandium (Sc), yttrium (Y), and a rare-earth element.

The symbols x, y and z satisfy 0<x<0.5, 0≤y<0.5, 0.7<z<1.3, respectively. The symbols a, b and c satisfy 0.1≤a≤2.3, 0≤b≤0.3, and 0.7≤c≤1.1, respectively.

The solid solution represented by Formula 1 may be formed by making a solid solution of Li$_a$M"$_b$Mo$_c$O$_3$ and LiM$_{1-y}$M'$_y$O$_2$. By forming the solid solution, the chemical stability of molybdenum (Mo) included in Li$_a$M"$_b$Mo$_c$O$_3$ may be improved to, e.g., suppress the discharging and deteriorating of Mo, thereby minimizing and/or preventing reduction in a capacity. Dissolution or decomposition may be minimized and/or prevented due to a reaction between the first lithium compound and an electrolyte.

The first lithium compound may include a solid solution represented by Formula 2 below:

<Formula 2>

M is at least one selected from the group consisting of titanium (Ti), vanadium (V), chromium (Cr), manganese (Mn), iron (Fe), cobalt (Co), nickel (Ni), and copper (Cu).

M' is at least one selected from the group consisting of magnesium (Mg), aluminum (Al), zinc (Zn), zirconium (Zr), gallium (Ga), and germanium (Ge).

The symbols x and y satisfy 0<x<0.3, and 0≤y<0.5, respectively.

Examples of the first lithium compound may include xLiFeO$_2$-(1-x) Li$_2$MoO$_3$ (where x satisfies 0<x<0.3).

In the solid solution of Formula 1, x as a composition ratio of each solid state may vary. The x as the composition ratio may be in the range of about 0 to about 0.5, e.g., 0<x<0.3.

Li$_a$M"$_b$Mo$_c$O$_3$, a component of the solid solution of Formula 1, may have a layered structure, and Mo in Li$_2$MoO$_3$ or Li$_2$MoO$_3$ may be substituted with a different metal element. M" in Formula 1 is a doping element for substituting Mo. Examples of M include Al, Ga, Ge, Mg, Nb, Zn, Cd, Ti, Co, Ni, K, Na, Ca, Si, Fe, Cu, Sn, V, B, P, Se, Bi, As, Zr, Mn, Cr, Sr, V, Sc, Y, a rare-earth element, and a mixture thereof. M may be at least one selected from the group consisting of Al, Ga, Ge, Mg, Nb, Zn, Cd, and Ti. For example, M may be at least one selected from the group consisting of Al, Mg, and Zn; or M may be at least one selected from the group consisting of Al and Zn. When Mo in the second lithium compound is substituted with a different element, interlayer transfer of Mo may be suppressed, e.g., during charging and discharging, and thus more lithium may be intercalated/deintercalated is suppressed, so that electrical characteristics such as capacitance characteristic are improved.

LiM$_{1-y}$M'$_y$O$_2$, a component of the solid solution of Formula 1, together with Li$_a$M"$_b$Mo$_c$O$_3$, may have a layered oxide structure, and M in LiMO$_2$ or LiMO$_2$ may be substituted with a different meal element. M is at least one selected from the group consisting of 1$^{st}$ period transition metals, e.g., Ti, V, Cr, Mn, Fe, Co, Ni, and Cu. M' that may substitute at least one of Ti, V, Cr, Mn, Fe, Co, Ni, and Cu, may be at least one selected from the group consisting of Mg, Al, Zn, Zr, Ga, and Ge.

As described above, the first lithium compound including the solid solution of Formula 1 may have a layered structure. The first lithium compound may have an average particle diameter of about 0.1 μm to about 10 μm. The average particle diameter may be about 0.2 μm to about 3 μm.

The first lithium compound including the solid solution of Formula 1 may further include carbon, and the amount of carbon may be in a range of about 0.1 wt % to about 5 wt % based on the total weight of the first lithium compound.

A lower limit voltage for charging and discharging may be set to 3V (based on lithium metal) before initial charging begins. The positive electrode should include the first lithium compound including the solid solution having a OCV of less than 3V and the second lithium compound having a OCV of 3V or greater. As a result, lithium ions may be deintercalated from both the first and second lithium compounds during the initial charging. However, during subsequent discharging, lithium ions may be mostly reintercalated into the second lithium compound, whereas the lithium ions deintercalated from the second lithium compound may not be reintercalated into the first lithium compound, and rather, a negative electrode active material may be doped with the lithium ions. During the cycles of charge and discharge subsequent to a second cycle of charge and discharge, lithium ions may be mostly deintercatated from and mostly reintercalated into the second lithium compound.

As described above, the negative electrode active material may be doped with the lithium ions deintercalated from the first lithium compound, so that the amount of transferable lithium ions may be increased even with a small depth of discharge in the negative electrode, and the negative electrode may be operated in a reversible range. Thus, deterioration of the negative electrode may be suppressed, and the cycle characteristics of the battery may be improved.

In addition, the negative electrode active material may be uniformly doped with lithium ions. An increase in resistance, and instability of the lithium metal (i.e., instability in the air, firing, low softness of the electrode, etc.) accompanied by an increased interlayer space in the negative electrode active material, which may occurs as the previously doped lithium ions are reintercalated from the negative electrode active material, may be suppressed.

The positive electrode may be charged and discharged at an upper limit voltage of 4.3 V or less (with respect to lithium). Under this range, when the positive electrode is charged and discharged, the lithium compounds may deteriorate, and layered structures may collapse. The second lithium compound reacts with electrolyte, and may be dissolved and decomposed, thereby minimizing and/or preventing a reduction in cycle characteristics.

In addition, even when a non-aqueous electrolyte secondary battery is over-discharged to less than 3 V, lithium ions may also be reintercalated into the first lithium compound, thereby minimizing and/or preventing further over-discharge of the battery.

The second lithium compound used in the positive electrode may have a layered structure, and may include a lithium metal compound containing at least one metal element selected from the group consisting of Co, Ni, and Mn. A metal element included in the second lithium compound may include at least one or two metal elements. Examples of the second lithium compound include $LiCoO_2$, $LiNiO_2$ and $LiMnO_2$, which may be used alone or in combination of at least two thereof.

The first lithium compound may be coated with a metal oxide, and thus discharging or decomposition of the first lithium compound may be effectively suppressed.

The metal oxide may be at least one selected from compounds represented by Formulae 3 through 6 below:

$$Me_a(MoO_3)_b \qquad \text{<Formula 3>}$$

Me is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li).

The symbol a satisfies $0.5 \leq a \leq 1.5$, and the symbol b satisfies $0.3 \leq b \leq 3$.

$$Me'_c(MoO_4)_d \qquad \text{<Formula 4>}$$

Me' is at least one selected from the group consisting of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li).

The symbol c satisfies $0.5 \leq c \leq 1.5$, and the symbol d satisfies $0.3 \leq d \leq 3.0$.

$$Me''O_e \qquad \text{<Formula 5>}$$

Me" is at least one selected from the group consisting of aluminium (Al), magnesium (Mg), silicon (Si), titanium (Ti), zirconium (Zr), zinc (Zn), barium (Ba), strontium (Sr), calcium (Ca), and lithium (Li).

The symbol e satisfies $0.5 \leq e \leq 2.5$.

$$Li_3PO_4 \qquad \text{<Formula 6>}$$

Such a metal oxide, e.g., in Formulae 3 to 6, may be coated on the surface of the first lithium compound to form a metal oxide coating layer, which may protect the first lithium compound.

Such a metal oxide may be used in an amount of about 0.1 to about 40 parts by weight, or about 2 to about 10 parts by weight, based on 100 parts by weight of the first lithium compound. When the amount of the metal oxide used is within this range, discharging or decomposition of the first lithium compound may be effectively suppressed.

A method of forming the metal oxide coating layer may be any method, for example, spray coating, immersion, precipitation, a sol-gel method, hydrolysis, a hydrothermal method, or the like, which do not adversely affect the physical properties of the negative electrode active material. This is obvious to those of skill in the art, and thus a detailed description thereof will not be provided here.

The first and second lithium compounds may be used in a form of a mixture by mixing the first and second lithium compounds, both in powder form. In this case, a mixing ratio may be determined according to kinds of the first and second lithium compounds. For example, the mixing ratio of the first and second lithium compounds may be, but is not limited to, about 0.01:about 0.99 to about 0.40:about 0.60.

One or more embodiments may include a lithium battery including a positive electrode, a negative electrode and an organic electrolyte solution, wherein the positive electrode includes the first lithium compound and the second lithium compound described above.

The type of the lithium battery is not limited, and may be, e.g., a lithium secondary battery, such as a lithium ion battery, a lithium ion polymer battery, a lithium sulfur battery, or the like, or a lithium primary battery.

The positive electrode may include a current collector and a positive electrode active material layer formed on the current collector. In order to form the positive electrode, such a positive electrode active material including the first lithium compound and the second lithium compound described above, a conducting agent, a binder and a solvent may be mixed to prepare a positive electrode active material composition. A positive electrode plate may be manufactured by directly coating the positive electrode active material composition on an aluminum current collector and drying to form a positive electrode active material layer. Alternatively, the positive electrode plate may be manufactured by casting the positive electrode active material composition on a separate support and laminating a positive electrode active material film exfoliated from the support on an aluminum current collector to form the positive electrode active material layer. The method of manufacturing the positive electrode is obvious to one of ordinary skill in the art, and thus a detailed description thereof will not be provided. The solvent may be N-methylpyrrolidone, acetone, water, or the like, but is not limited thereto.

The positive electrode active material for forming the positive electrode active material layer may include the first lithium compound having an OCV (based on lithium metal) of less than 3V and the second lithium compound having an OCV of 3V or greater, wherein the first lithium compound may include the solid solution of Formula 1.

The binder contained in the positive electrode active material layer functions to strongly bind positive electrode active material particles together and to the current collector. Examples of the binder may include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent included in the positive electrode active material layer may be used to give the positive electrode conductivity. Any electronic conductive material causing no chemical change in batteries may be used. Examples of the conducting agent may include, but are not limited to, carbonaceous materials, such as natural graphite, artificial graphite, carbon black, acetylene black, ketchen black, and carbon fibers; metal-based materials, such as copper, nickel, aluminum, and silver, in powder or fiber form; and conducting materials, including conducting polymers, such as a polyphenylene derivative, and a mixture thereof.

The current collector may be aluminum (Al), but is not limited thereto.

Similarly to the manufacturing of the positive electrode plate described above, a negative electrode active material, a conducting agent, a binder, and a solvent may be mixed to prepare a negative electrode active material composition. The negative electrode active material composition is directly coated on a copper current collector to prepare a negative electrode plate. Alternatively, the negative electrode material composition may be cast on a separate support, and then a negative electrode active material film delaminated from the support may be laminated on the copper current collector to prepare a negative electrode plate. The amounts of the negative electrode active material, the conducting agent, the binder, and the solvent may be the same as those commonly used in a lithium battery.

Examples of the negative electrode active material may include materials capable of intercalating and deintercalating lithium ions, such as lithium metal, a lithium alloy, cokes, artificial graphite, natural graphite, a fired product of an organic polymer compound, and carbon fiber. The same conducting agent, binder and solvent as for the positive electrode may be used for the negative electrode.

If necessary, a plasticizer may be added to the positive electrode active material composition and the negative electrode active material composition to form pores inside the electrode plates.

A separator may be disposed between the positive electrode and the negative electrode according to the type of the lithium battery. Any separator that is commonly used for lithium batteries may be used. In an embodiment, the separator may have low resistance to migration of ions in an electrolyte and have high electrolyte-retaining ability. Examples of the separator may include glass fiber, polyester, Teflon, polyethylene, polypropylene, polytetrafluoroethylene (PTFE), and a combination thereof, each of which may be a nonwoven fabric or a woven fabric. In particular, a windable separator including polyethylene, polypropylene or the like may be used for a lithium ion battery. A separator capable of retaining a large amount of an organic electrolyte solution may be used for a lithium-ion polymer battery. Such a separator may be manufactured as follows.

A polymer resin, a filler, and a solvent may mixed to prepare a separator composition. Then, the separator composition may be directly coated on an electrode, and then dried to form a separator film. Alternatively, the separator composition may be cast on a separate support and then dried to form a separator composition film, and the separator composition film separated from the support may be laminated on an electrode to form a separator film.

The polymer resin may be any material that is commonly used as a binder for an electrode plate. Examples of the polymer resin include a vinylidenefluoride/hexafluoropropylene copolymer, polyvinylidenefluoride, polyacrylonitrile, polymethylmethacrylate, and mixtures thereof. For example, a vinylidenefluoride/hexafluoropropylene copolymer having about 8 to about 25 wt % of hexafluoropropylene may be used.

The separator may be interposed between the positive electrode plate and the negative electrode plate to form a battery assembly. The battery assembly may be wound or folded and then sealed in a cylindrical or rectangular battery case. Then, an organic electrolyte solution may be injected into the battery case to complete the manufacture of a lithium ion battery. Alternatively, a plurality of electrode assemblies may be stacked in a bi-cell structure and impregnated with an organic electrolyte solution according to an embodiment of the present invention. The resultant may be put into a pouch and sealed, thereby completing the manufacture of a lithium ion polymer battery.

FIG. 1 is a schematic view of a structure of a lithium battery 30 according to an exemplary embodiment. Referring to FIG. 1, the lithium battery 30 may include a positive electrode 23, a negative electrode 22, a separator 24 interposed between the positive electrode 23 and the negative electrode 22, an electrolyte solution impregnated into the positive electrode 23, the negative electrode 22 and the separator 24, a battery case 25, and a sealing member 26 sealing the battery case 25. The lithium battery 30 may be manufactured by sequentially stacking the positive electrode 23, the negative electrode 22 and the senator 24 upon one another, winding the stack in a spiral form, and accommodating the wound stack in the battery case 25.

Hereinafter, one or more embodiments will be described in detail with reference to the following examples. However, these examples are not intended to limit the purpose and scope of the present invention.

Comparative Example 1

Preparation of Positive Electrode Active Material

Initially, Li$_2$MoO$_4$ was prepared through a solid-phase reaction. To this end, Li$_2$CO$_3$ and MoO$_3$, both in powder form, were mixed in a ratio of 1.05:1 by weight and reacted at 500° C. for 5 hours. A white, homogeneous Li$_2$MoO$_4$ composition was prepared, and carbon was added in the same mole number as Li$_2$MoO$_4$ and then uniformly mixed for a reaction represented by Reaction Scheme 1 below. The reaction was processed at 700° C. in a reducing atmosphere for 10 hours.

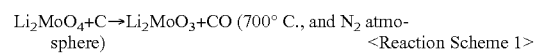

Li$_2$MoO$_4$+C→Li$_2$MoO$_3$+CO (700° C., and N$_2$ atmosphere)     <Reaction Scheme 1>

Li$_2$MoO$_3$ prepared as described above was mixed with LiCoO$_2$ a molar ratio 2:8 by weight to prepare positive electrode active material powders.

Manufacture of Lithium Battery

In order to evaluate a high temperature charging and discharging lifetime, a 2032 coin cell was prepared by using silicon oxide (SiO$_x$) electrode as a negative electrode, a mixture formed by mixing $Li_2MoO_3$ with $LiCoO_2$ in a molar ratio 2:8, as a positive electrode, celgard as a separator, and an organic electrolyte solution.

A positive electrode material was prepared as a slurry by adding and thoroughly mixing $Li_2MoO_3$ and $LiCoO_2$ powders, a binder in which 6 wt % of polyvinylidenefluoride (PVdF) is dissolved in N-methylpyrrolidone (NMP), and a conducting agent (super P) in a weight of 96:2:2, in a agate mortar.

The slurry was casted on an aluminum foil having a thickness of 15 µm at an interval of about 100 µm by using a doctor blade to obtain a positive electrode plate. The positive electrode plate was put into an oven and dried first at 90° C. for about 2 hours so that the NMP is evaporated, and then was put into a vacuum oven and dried again at 120° C. for about 2 hours so that the NMP is completely evaporated. Then, the positive electrode plate was rolled to obtain a positive electrode having a thickness of 60 p.m.

A negative electrode material was prepared as a slurry by adding and thoroughly mixing silicon oxide ($SiO_x$) powder and a binder in which polyamideimide is dissolved in a ratio of 90:10 by weight, in a mortar. The slurry was casted on a copper foil having a thickness of 10 µm at an interval of 60 µm by using a doctor blade to obtain a negative electrode plate. The negative electrode plate was put into an oven and dried at 90° C. for 2 hours, and then rolled to have a thickness of 47 p.m. The negative electrode plate was cured in a vacuum oven at 200° C. for 1 hour to obtain a negative electrode.

Example 1

Preparation of Positive Electrode Active Material

Initially, $Li_2MoO_4$ was prepared through a solid-phase reaction. To this end, $Li_2CO_3$ and $MoO_3$, both in powder form, were mixed in a ratio of 1.05:1 by weight and reacted at 500° C. for 5 hours. A white, homogeneous $Li_2MoO_4$ composition was prepared, and carbon was added in the same mole number as $Li_2MoO_4$, and then uniformly mixed for a reaction represented by Reaction Scheme 1 below. The reaction was processed at 700° C. in a reducing atmosphere for 10 hours.

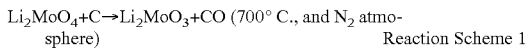

$Li_2MoO_4+C \rightarrow Li_2MoO_3+CO$ (700° C., and $N_2$ atmosphere)    Reaction Scheme 1

A $Li_2MoO_3$ powder manufactured as described was mixed with $Li_2CO_3$ and $Fe_2O_3$, both in powder form, in a molar ratio of 9:0.5:0.5, and then heat treatment was performed on the mixture at 1000° C. in a nitrogen atmosphere for 6 hours to prepare 0.1 $LiFeO_2$-0.9 $Li_2MoO_3$ solid solution.

The 0.1 $LiFeO_2$-0.9 $Li_2MoO_3$ solid solution prepared as described was mixed with $LiCoO_2$ in a ratio of 2:8 by weight to prepare a positive electrode active material powder.

Manufacture of Lithium Battery

A coin cell was prepared in the same manner as in Comparative Example 1, except that the positive electrode active powder prepared in Example 1 was used.

Example 2

Preparation of Positive Electrode Active Material

Initially, $Li_2MoO_4$ was prepared through a solid-phase reaction. To this end, $Li_2CO_3$ and $MoO_3$, both in powder form, were mixed in a ratio of 1.05:1 by weight and reacted at 500° C. for 5 hours. A white, homogeneous $Li_2MoO_4$ composition was prepared, and carbon was added in the same mole number as $Li_2MoO_4$, and then uniformly mixed for a reaction represented by Reaction Scheme 1 below. The reaction was processed at 700° C. in a reducing atmosphere for 10 hours.

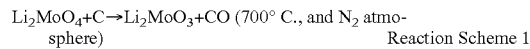

$Li_2MoO_4+C \rightarrow Li_2MoO_3+CO$ (700° C., and $N_2$ atmosphere)    Reaction Scheme 1

A $Li_2MoO_3$ powder manufactured as described was mixed with $Li_2CO_3$ and $Fe_2O_3$, both in powder form, in a molar ratio of 8:1:1, and then heat treatment was performed on the mixture at 1000° C. in a nitrogen atmosphere for 6 hours to prepare 0.2 $LiFeO_2$-0.8 $Li_2MoO_3$ solid solution.

The 0.2 $LiFeO_2$-0.8 $Li_2MoO_3$ solid solution prepared as described was mixed with $LiCoO_2$ in a ratio of 2:8 by weight to prepare a positive electrode active material powder.

Manufacture of Lithium Battery

A coin cell was prepared in the same manner as in Comparative Example 1 except that the positive electrode active powder prepared in Example 2 was used.

Example 3

Preparation of Positive Electrode Active Material

Initially, $Li_2MoO_4$ was prepared through a solid-phase reaction. To this end, $Li_2CO_3$ and $MoO_3$, both in powder form, were mixed in a ratio of 1.05:1 by weight and reacted at 500° C. for 5 hours. A white, homogeneous $Li_2MoO_4$ composition was prepared, and carbon was added in the same mole number as $Li_2MoO_4$, and then uniformly mixed for a reaction represented by Reaction Scheme 1 below. The reaction was processed at 700° C. in a reducing atmosphere for 10 hours.

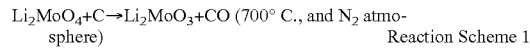

$Li_2MoO_4+C \rightarrow Li_2MoO_3+CO$ (700° C., and $N_2$ atmosphere)    Reaction Scheme 1

A $Li_2MoO_3$ powder manufactured as described was mixed with $Li_2CO_3$ and $Fe_2O_3$, both in powder form, in a molar ratio of 7:1.5:1.5, and then heat treatment was performed on the mixture at 1000° C. in a nitrogen atmosphere for 6 hours to prepare 0.3 $LiFeO_2$-0.7 $Li_2MoO_3$ solid solution.

The 0.3 $LiFeO_2$-0.7 $Li_2MoO_3$ solid solution prepared as described was mixed with $LiCoO_2$ in a ratio of 2:8 by weight to prepare a positive electrode active material powder.

Manufacture of Lithium Battery

A coin cell was prepared in the same manner as in Comparative Example 1, except that the positive electrode active powder prepared in Example 3 was used.

Experimental Example 1

Figure 2:
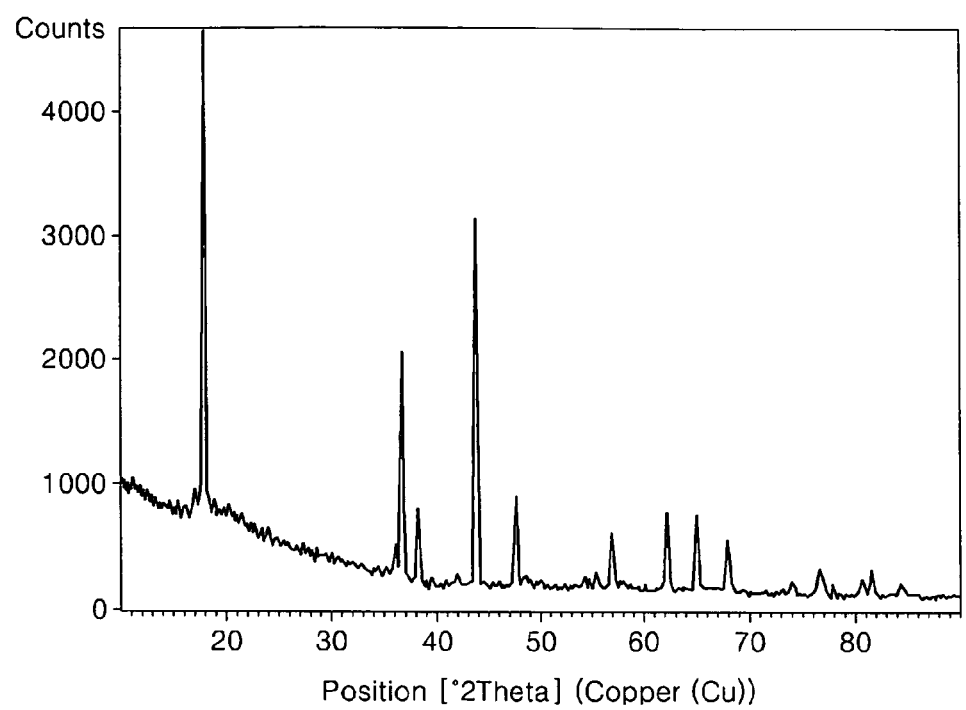
FIG. 2 illustrates a graph of X-ray diffraction (XRD) pattern of $Li_2MoO_3$ prepared in Comparative Example 1.
Figure 3:
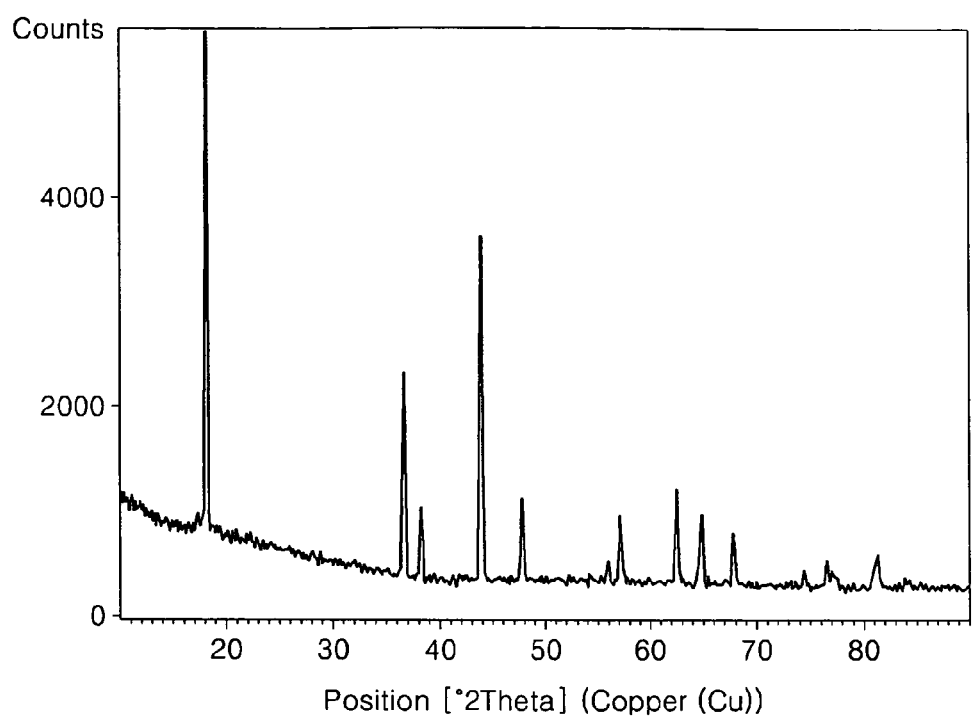
FIG. 3 illustrates a graph of XRD pattern of 0.2 LiFeO$_2$-0.8 Li$_2$MoO$_3$ prepared in Example 2.
Figure 4:
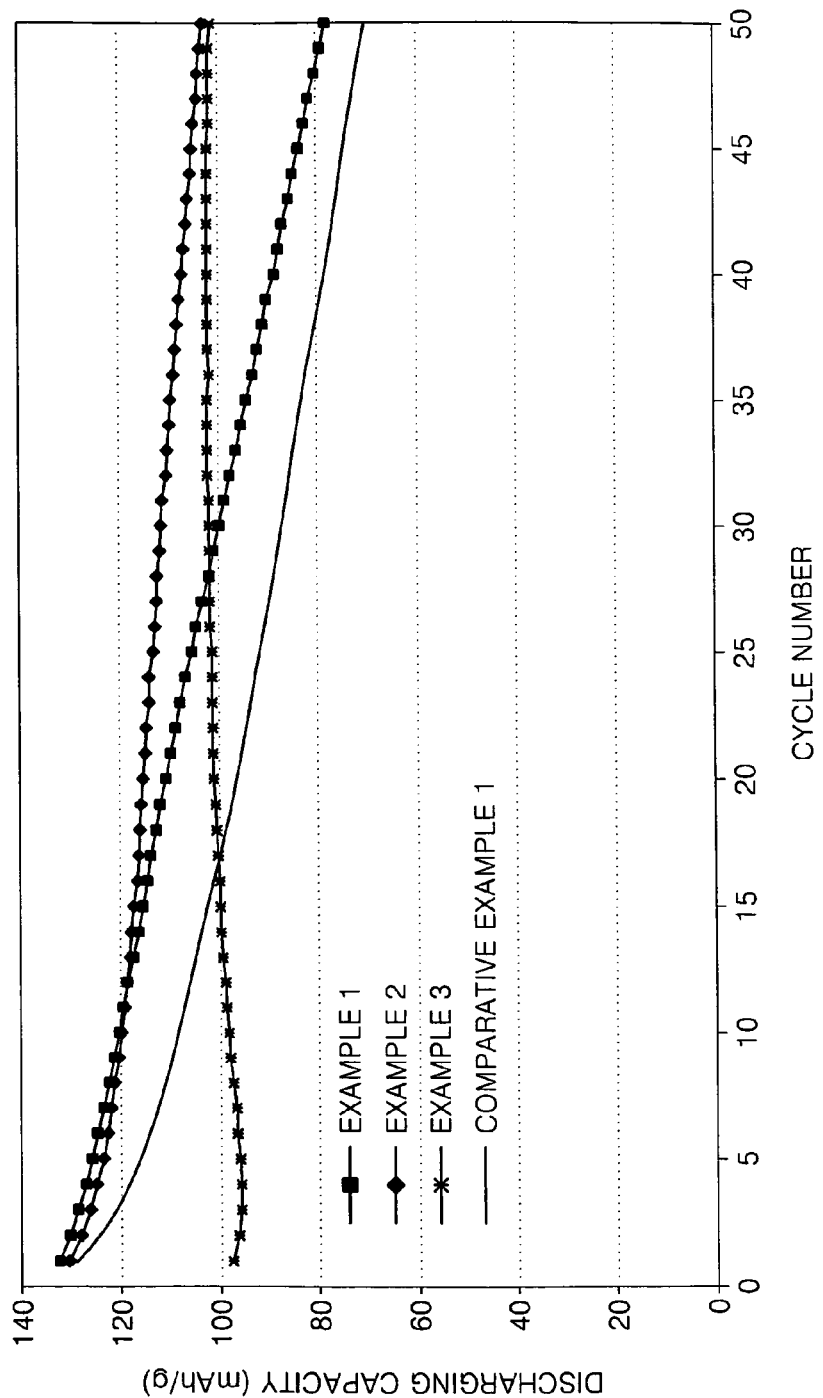
FIG. 4 illustrates a graph of discharge capacities of coin cells prepared according to Comparative Example 1, and Examples 1-3 with respect to a cycle number.

FIG. 2 is a graph of X-ray diffraction (XRD) pattern of $Li_2MoO_3$ prepared in Comparative Example 1, and FIG. 3 is a graph of XRD pattern of the 0.2 $LiFeO_2$-0.8 $Li_2MoO_3$ prepared in Example 2.

As shown in FIGS. 2 and 3, from the similarity of the graphs of FIGS. 2 and 3, it may be seen that even though $LiFeO_2$ is contained in a solid solution in Example 2, $LiFeO_2$ maintains the same layered structure as in $Li_2MoO_3$ of Comparative Example 1, which does not use a solid solution.

Experimental Example 2

A following charging and discharging test was performed on the coin cells prepared according to Example 1 through 3 and Comparative Example 1, at 60° C.

Each coin cell was charged up to 4.35 V at the rate of 0.05 C, and then discharged down to 2.5 V at the rate of 0.05 C, in a 1st cycle. In a 2nd cycle, each coin cell was charged up to 4.35 V at the rate of 0.1 C, maintained at 4.35 V until a current reached 0.05 C, and then discharged down to 2.5 V at the rate of 0.1 C. In a 3rd cycle, each coin cell was charged up to 4.35 V at the rate of 0.5 C, maintained at 4.35 V until a current reached 0.05 C, and then discharged down to 2.5 V at the rate of 0.1 C. From 4th to 84th cycles, each coin cell was charged under the same condition as above at the rate of 1 C, and discharged down to 2.5 V at the rate of 0.8 C. Cycles from the 4th cycle is referred to as a cycling mode, and the 4th cycle is referred to as a 1st cycle in the cycling mode. Results of charging and discharging each coin cell up to the 84th cycles are shown in Table 1 and FIGS. 2 and 3. A capacity retention rate at 84th cycle at 60° C. is defined by Equation 1 below.

Capacity retention rate at 50th cycle (at 60° C.)[%]=50th-cycle discharge capacity at 60° C./1st-cycle discharge capacity at 60° C.   Equation 1

TABLE 1

| Division | 50th-Cycle Capacity Retention Rate at 60° C. [%] |
| --- | --- |
| Comparative Example 1 | 54.4 |
| Example 1 | 59 |
| Example 2 | 79.1 |
| Example 3 | 103.7 |

In a case of Comparative Example 1 without a solid solution, a reduction in discharge capacity according to a cycle number is greater than in Examples 1 through 3. On the other hand, in a case of Examples 1 through 3, a reduction in discharge capacity according to a cycle number is small, and lifetime characteristics are improved, compared to Comparative Example 1.

Experimental Example 3

Figure 5:
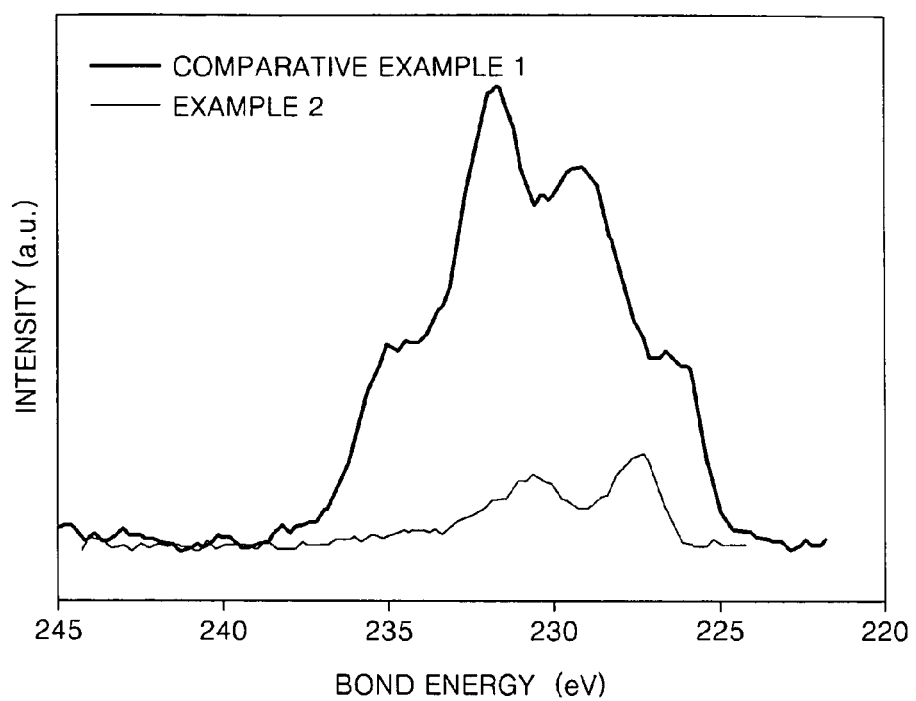
FIG. 5 illustrates a graph showing X-ray photon spectroscopy (XPS) results of molybdenum (Mo) on lithium opposite electrodes of batteries according to Comparative Example 1 and Example 2.

A half cell (2032 size) was assembled from an electrode manufactured by coating an Al foil with a slurry containing the positive electrode active material prepared in Comparative Example 1 and Example 2, a conducting agent (Ketchen black) and a PvdF binder in a weight ratio of 93:2:5, and from a lithium opposite electrode. Then, the half cell was charged at 60° C. and a constant current of 0.05 C, 4.4 V (with respect to Li). Li was charged at a constant current of 0.05 C. The cell was disassembled in a glove box, and an opposite electrode (lithium metal) was washed with dimethyl carbonate (DMC and dried. Then, the cell was moved for X-ray photon spectroscopy (XPS), and discharge of Mo was analyzed. The analysis result was shown in FIG. 5.

In a case of Comparative Example 1, Mo indicates a clear mark. However, in a case of Example, Mo indicates a weak mark. This indicates that the surface coating layer of the active material effectively suppresses the discharge of Mo at a high temperature and a high voltage.

In a positive electrode including two different first and second lithium compounds, the positive electrode active material includes a first lithium compound having an open-circuit voltage is made as a solid solution, and thus the chemical stability of the positive electrode is improved, and a reduction in a capacity may be prevented when the positive electrode is used in a battery, thereby improving electrical characteristics.

By way of summation and review, transition metal compounds such as $LiNiO_2$, $LiCoO_2$, $LiMn_2O_4$, $LiFePO_4$, 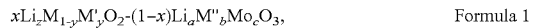$LiNi_xCO_{1-x}O_2$ (0<x<1), and $LiNi_{1-x-y}Co_xMn_yO_2$ (0≤x≤0.5 and 0≤y≤0.5) may be used as positive electrode active materials for lithium batteries.

$Li_2MoO_3$ is recently drawing more attention as an active material because the active material does not contain cobalt (Co), which is expensive and toxic. However, deintercalation of lithium is suppressed due to interlayer movement of $Mo^{6+}$ ions, which are generated during charging. Therefore, it may be necessary to improve the active materials.

It should be understood that the exemplary embodiments described therein should be considered in a descriptive sense only and not for purposes of limitation. Descriptions of features or aspects within each embodiment should typically be considered as available for other similar features or aspects in other embodiments. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A positive electrode having a surface on which a positive electrode active material composition including a positive electrode active material is formed, the positive electrode comprising:
  a solid solution having an open-circuit voltage less than 3 V with respect to lithium metal; and
  a lithium compound having an open-circuit voltage of 3 V or greater with respect to lithium metal, wherein:
  the solid solution is represented by Formula 1 below:

$$xLi_zM_{1-y}M'_yO_2\text{-}(1-x)Li_aM''_bMo_cO_3,$$   Formula 1

M is at least one of titanium (Ti), vanadium (V), chromium (Cr), manganese (Mn), iron (Fe), cobalt (Co), nickel (Ni), and copper (Cu);
  M' is at least one of magnesium (Mg), aluminum (Al), zinc (Zn), zirconium (Zr), gallium (Ga), and germanium (Ge);
  M" is at least one of aluminum (Al), gallium (Ga), germanium (Ge), magnesium (Mg), niobium (Nb), zinc (Zn), cadmium (Cd), titanium (Ti), cobalt (Co), nickel (Ni), potassium (K), sodium (Na), calcium (Ca), silicon (Si), iron (Fe), copper (Cu), tin (Sn), vanadium (V), boron (B), phosphorus (P), selenium (Se), bismuth (Bi), arsenic (As), zirconium (Zr), manganese (Mn), chromium (Cr), strontium (Sr), vanadium (V), scandium (Sc), yttrium (Y), and a rare-earth element;
  x, y and z satisfy 0<x<0.5, 0≤y<0.5, and 0.7<z<1.3 respectively; and
  a, b and c satisfy 0.1≤a≤2.3, 0≤b≤0.3, and 0.7≤c≤1.1, respectively, wherein the $Li_zM_{1-y}M'_yO_2$ of the solid solution represented by Formula 1 is different from the lithium compound, and wherein the solid solution and the lithium compound form a mixture, the mixture including about 1 to about 40 weight percent of the solid solution and about 60 to about 99 weight percent of the lithium compound, based on a total weight of the solid solution and the lithium compound in the mixture.

2. The positive electrode as claimed in claim 1, wherein the solid solution represented by Formula 1 is a solid solution represented by Formula 2 below:

$$xLiM_{1-y}M'_yO_2\text{-}(1-x)Li_2MoO_3, \quad \text{Formula 2}$$

M is at least one of titanium (Ti), vanadium (V), chromium (Cr), manganese (Mn), iron (Fe), cobalt (Co), nickel (Ni), and copper (Cu);

M' is at least one of magnesium (Mg), aluminum (Al), zinc (Zn), zirconium (Zr), gallium (Ga), and germanium (Ge); and x and y satisfy $0<x<0.3$, and $0\leq y<0.5$, respectively.

3. The positive electrode as claimed in claim 1, wherein the lithium compound includes at least one of cobalt (Co), nickel (Ni), and manganese (Mn).

4. The positive electrode as claimed in claim 1, wherein the solid solution represented by Formula 1 includes $xLiFeO_2\text{-}(1-x)Li_2MoO_3$, where x satisfies $0<x<0.3$.

5. The positive electrode as claimed in claim 1, further comprising a metal oxide coating layer on the solid solution.

6. The positive electrode as claimed in claim 5, wherein the metal oxide coating layer includes at least one compound selected from compounds represented by Formulae 3 through 6 below:

$$Me_a(MoO_3)_b, \quad \text{Formula 3}$$

where Me is at least one of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li), a satisfies $0.5\leq a\leq 1.5$, and b satisfies $0.3\leq b\leq 3$;

$$Me'_c(MoO_4)_d, \quad \text{Formula 4}$$

where Me' is at least of barium (Ba), calcium (Ca), strontium (Sr), lead (Pb), manganese (Mn), iron (Fe), cobalt (Co), nickel (Ni), copper (Cu), zinc (Zn), magnesium (Mg), cadmium (Cd), silver (Ag), and lithium (Li), c satisfies $0.5\leq c\leq 1.5$, and d satisfies $0.3\leq d\leq 3.0$;

$$Me''O_e, \quad \text{Formula 5}$$

where Me'' is at least of aluminium (Al), magnesium (Mg), silicon (Si), titanium (Ti), zirconium (Zr), zinc (Zn), barium (Ba), strontium (Sr), calcium (Ca) and lithium (Li), and e satisfies $0.5\leq e\leq 2.5$; and $$Li_3PO_4. \quad \text{Formula 6}$$

7. The positive electrode as claimed in claim 1, wherein the solid solution includes two different lithium compounds therein, and the lithium compound is different from each of the two different lithium compounds.

8. The positive electrode as claimed in claim 1, wherein the positive electrode is formed from a positive electrode active material powder that includes the solid solution mixed with the lithium compound.

9. The positive electrode as claimed in claim 1, wherein the positive electrode includes the solid solution and the lithium compound in an amount of about 0.2 parts by weight of the solid solution and about 0.80 parts by weight of the lithium compound, based on a total of 1 part by weight of the solid solution and the lithium compound.

10. The positive electrode as claimed in claim 1, wherein:
the solid solution represented by Formula 1 is a solid solution represented by Formula 3 below:

$$xLiM_{1-y}M'_yO_2\text{-}(1-x)Li_2MoO_3, \quad \text{Formula 3}$$

M is at least one of titanium (Ti), vanadium (V), chromium (Cr), iron (Fe), and copper (Cu);

M' is at least one of magnesium (Mg), aluminum (Al), zinc (Zn), zirconium (Zr), gallium (Ga), and germanium (Ge); and x and y satisfy $0<x<0.3$, and $0\leq y<0.5$, respectively; and the second lithium compound includes at least one of cobalt (Co), nickel (Ni), and manganese (Mn).

11. A lithium battery, comprising:
a positive electrode as claimed in claim 1;
a negative electrode; and
an organic electrolyte.

* * * * *